(12) United States Patent
Clark

(10) Patent No.: US 8,351,774 B2
(45) Date of Patent: Jan. 8, 2013

(54) WIRELESS COMMUNICATION SYSTEM AND METHOD FOR PHOTOGRAPHIC FLASH SYNCHRONIZATION

(75) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 0 days.

(21) Appl. No.: 13/399,333

(22) Filed: Feb. 17, 2012

(65) Prior Publication Data

US 2012/0148221 A1 Jun. 14, 2012

Related U.S. Application Data

(63) Continuation of application No. 12/843,254, filed on Jul. 26, 2010, now Pat. No. 8,121,468, which is a continuation of application No. 12/104,950, filed on Apr. 17, 2008, now Pat. No. 7,764,875, which is a continuation of application No. 11/529,203, filed on Sep. 27, 2006, now Pat. No. 7,362,965, which is a continuation of application No. 11/305,668, filed on Dec. 16, 2005, now Pat. No. 7,133,607, which is a continuation of application No. 10/306,759, filed on Nov. 26, 2002, now Pat. No. 7,016,603.

(51) Int. Cl.
*G03B 17/00* (2006.01)
*G03B 17/48* (2006.01)
(52) U.S. Cl. .............................. 396/56; 396/59; 396/429
(58) Field of Classification Search .............. 396/56–59, 396/263, 429; 348/14.05, 14.02, 114, 211.99, 348/211.2, 725, 734
See application file for complete search history.

(56) References Cited

U.S. PATENT DOCUMENTS

| 3,039,375 | A | 6/1962 | Umbach |
| 3,185,056 | A | 5/1965 | Gold et al. |
| 3,205,803 | A | 9/1965 | Burgarella et al. |
| 3,259,042 | A | 7/1966 | Kagan |
| RE26,627 | E | 7/1969 | Burgarella et al. |
| 3,659,509 | A | 5/1972 | Burgarella |
| 3,728,947 | A | 4/1973 | Harnden et al. |
| 3,782,258 | A | 1/1974 | Boekkooi et al. |
| 3,810,214 | A | 5/1974 | Malone et al. |
| 4,047,191 | A | 9/1977 | Coppa et al. |

(Continued)

FOREIGN PATENT DOCUMENTS

EP 0984320 8/1999

(Continued)

OTHER PUBLICATIONS

Preliminary Remarks dated Jul. 27, 2010, in related U.S. Appl. No. 12/843,254, entitled "Wireless Communication System and Method for Photographic Flash Synchronization," filed in the name of James E. Clark.

(Continued)

*Primary Examiner* — Rochelle-Ann J Blackman
(74) *Attorney, Agent, or Firm* — Downs Rachlin Martin PLLC

(57) ABSTRACT

A system and method for controlling one or more remote photographic flash devices from a metal camera body. Wireless functionality within a camera body provides wireless communication of a signal from within the camera body to one or more remote devices. In one example, a flash synchronization signal of the camera body may be wirelessly communicated using a wireless communication functionality within the camera body and an external antenna to one or more remote flash devices for triggering the one or more remote flash devices.

43 Claims, 9 Drawing Sheets

U.S. PATENT DOCUMENTS

| | | | |
|---|---|---|---|
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,740,804 A | 4/1988 | Shands |
| 4,816,850 A | 3/1989 | Philipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 7,016,603 B2 | 3/2006 | Clark |
| 7,133,607 B2 | 11/2006 | Clark |
| 7,362,965 B2 | 4/2008 | Clark |
| 7,437,063 B2 | 10/2008 | Clark |
| 7,702,228 B2 | 4/2010 | Clark |
| 7,764,875 B2 | 7/2010 | Clark |
| 7,775,575 B2 | 8/2010 | Clark |
| 7,783,188 B2 | 8/2010 | Clark |
| 7,880,761 B2 | 2/2011 | Clark |
| 7,885,533 B2 | 2/2011 | Clark |
| 7,970,267 B1 | 6/2011 | Clark |
| 8,121,468 B2 | 2/2012 | Clark |
| 8,180,210 B2 | 5/2012 | Clark |
| 2001/0042149 A1 | 11/2001 | Ito et al. |
| 2002/0009296 A1 | 1/2002 | Shaper et al. |
| 2002/0067425 A1 | 6/2002 | Iverson |
| 2002/0067923 A1 | 6/2002 | Fujimura |
| 2002/0127019 A1 | 9/2002 | Ogasawara |
| 2003/0128272 A1 | 7/2003 | Clough et al. |
| 2003/0133018 A1 | 7/2003 | Ziemkowski |
| 2003/0193588 A1 | 10/2003 | Yuen et al. |
| 2004/0036774 A1 | 2/2004 | Nichols et al. |
| 2004/0101295 A1 | 5/2004 | Clark |
| 2005/0006484 A1 | 1/2005 | Ito |
| 2006/0093341 A1 | 5/2006 | Clark |
| 2007/0058959 A1 | 3/2007 | Clark |
| 2008/0193114 A1 | 8/2008 | Clark |
| 2010/0290771 A1 | 11/2010 | Clark |
| 2011/0123185 A1 | 5/2011 | Clark |
| 2011/0128390 A1 | 6/2011 | Clark |
| 2012/0027395 A1 | 2/2012 | Clark |
| 2012/0099847 A1 | 4/2012 | Clark |
| 2012/0127361 A1 | 5/2012 | Clark |
| 2012/0140088 A1 | 6/2012 | Clark |
| 2012/0148221 A1 | 6/2012 | Clark |
| 2012/0207459 A1 | 8/2012 | Clark |
| 2012/0207460 A1 | 8/2012 | Clark |

FOREIGN PATENT DOCUMENTS

| | | | |
|---|---|---|---|
| JP | 56-143422 | | 11/1981 |
| JP | 59-064821 | A | 4/1984 |
| JP | 59-170822 | | 9/1984 |
| JP | 63-018874 | | 1/1988 |
| JP | 63018874 | | 1/1988 |
| JP | 05-093948 | | 4/1993 |
| JP | 05093948 | | 4/1993 |
| JP | 2002-244193 | A | 8/2002 |
| JP | 2002-318413 | | 10/2002 |
| JP | 2003-172970 | A | 6/2003 |
| JP | 2003-325451 | | 11/2003 |
| JP | 2004-072230 | | 3/2004 |
| JP | 2004072230 | | 3/2004 |
| WO | 2010093914 | A1 | 8/2010 |
| WO | 2010093927 | A1 | 8/2010 |
| WO | 2010093994 | A1 | 8/2010 |
| WO | 2012009537 | A1 | 1/2012 |

OTHER PUBLICATIONS

Declaration of James E. Clark dated Jul. 26, 2010, in related U.S. Appl. No. 12/843,254, entitled "Wireless Communication System and Method for Photographic Flash Synchronization," filed in the name of James E. Clark.

Office Action dated Aug. 25, 2011, in related U.S. Appl. No. 12/843,254, entitled "Wireless Communication System and Method for Photographic Flash Synchronization," filed in the name of James E. Clark.

Terminal Disclaimer dated Aug. 25, 2011, in related U.S. Appl. No. 12/843,254, entitled "Wireless Communication System and Method for Photographic Flash Synchronization," filed in the name of James E. Clark.

Response to Office Action dated Aug. 25, 2011, in related U.S. Appl. No. 12/843,254, entitled "Wireless Communication System and Method for Photographic Flash Synchronization," filed in the name of James E. Clark.

Notice of Allowance dated Nov. 28, 2011, in related U.S. Appl. No. 12/843,254, entitled "Wireless Communication System and Method for Photographic Flash Synchronization," filed in the name of James E. Clark.

ASH Transceiver Impedance Matching; http://www.rfm.com/products/apnotes/antenamatch.pdf; pp. 1-10; viewed on Dec. 15, 2005; document created on Dec. 10, 2001.

Beta presentation of prototype module at Nikon meeting on Nov. 17, 2001.

Beta presentation of prototype module at Nikon and Mamiya meetings on Nov. 1, 2001.

Beta testing of prototype module by Nikon employee on Oct. 25, 2001.

Beta testing of prototype module by Sports Illustrated photographer in late Oct. and Nov. 2001.

Nikon Camera at Nikon for repair of locked up mirror and camera circuitry on or about Nov. 20, 2001.

FreeWireTM; http://qtm.com/wireless/freewire.html; pp. 1-6; viewed Feb. 8, 2002.

Mahany, Ronald L., PCT WO96/38925, Dec. 5, 1996.

Equipment Corner—News & Notes for all those Gear-Heads; pp. 1-3; http://www.sportsshooter.com/news_story.html?id=594; posted Nov. 26, 2001 by Robert Hanashiro.

PocketWizard MultiMAX Transceiver [Remote Control Radio Slave]; pp. 1-6; http://pocketwizard.com/HTML/products.asp; viewed Feb. 8, 2002.
Various prefiling activity as set forth in the 1.131 Declaration submitted on Feb. 18, 2005 in U.S. Appl. No. 10/306,759, now U.S. Patent No. 7,016,603.
XE-200 RF Shutter Release for Rebel 2000; http://zenopuselectronix.com/Xe-200.html; viewed on Sep. 9, 2002.
Office Action mailed Aug. 14, 2007, in U.S. Appl. No. 11/529,203, filed Sep. 27, 2006, now U.S. Patent No. 7,362,965.
Response to Office Action dated Oct. 16, 2007, in U.S. Appl. No. 11/529,203, filed Sep. 27, 2006, now U.S. Patent No. 7,362,965.
Terminal Disclaimer dated Oct. 25, 2007, in U.S. Appl. No. 11/529,203, filed Sep. 27, 2006, now U.S. Patent No. 7,362,965.
Notice of Allowability mailed Dec. 14, 2007, in U.S. Appl. No. 11/529,203, filed Sep. 27, 2006, now U.S. Patent No. 7,362,965.
Office Action mailed Mar. 8, 2006, in U.S. Appl. No. 11/305,668, filed Dec. 16, 2005, now U.S. Patent No. 7,133,607.
Response to Office Action dated Jun. 8, 2006, in U.S. Appl. No. 11/305,668, filed Dec. 16, 2005, now U.S. Patent No. 7,133,607.
Supplemental Response to Request for Clarification by the Examiner dated Jun. 13, 2006, in U.S. Appl. No. 11/305,668, filed Dec. 16, 2005, now U.S. Patent No. 7,133,607.
Notice of Allowability mailed Jun. 30, 2006, in U.S. Appl. No. 11/305,668, filed Dec. 16, 2005, now U.S. Patent No. 7,133,607.
Office Action mailed Aug. 29, 2003, in U.S. Appl. No. 10/306,759, filed Nov. 26, 2002, now U.S. Patent No. 7,016,603.
Response to Office Action dated Dec. 18, 2003, in U.S. Appl. No. 10/306,759, filed Nov. 26, 2002, now U.S. Patent No. 7,016,603.
Final Office Action mailed Mar. 27, 2004, in U.S. Appl. No. 10/306,759, filed Nov. 26, 2002, now U.S. Patent No. 7,016,603.
Response to Final Office Action dated Apr. 20, 2004, in U.S. Appl. No. 10/306,759, filed Nov. 26, 2002, now U.S. Patent No. 7,016,603.
Office Action mailed Aug. 24, 2004, in U.S. Appl. No. 10/306,759, filed Nov. 26, 2002, now U.S. Patent No. 7,016,603.
Request for Continued Examination dated Feb. 18, 2005, in U.S. Appl. No. 10/306,759, filed Nov. 26, 2002, now U.S. Patent No. 7,016,603.
Office Action mailed Mar. 29, 2005, in U.S. Appl. No. 10/306,759, filed Nov. 26, 2002, now U.S. Patent No. 7,016,603.
Response to Office Action dated Apr. 14, 2005, in U.S. Appl. No. 10/306,759, filed Nov. 26, 2002, now U.S. Patent No. 7,016,603.
Final Office Action mailed Jun. 29, 2005, in U.S. Appl. No. 10/306,759, filed Nov. 26, 2002, now U.S. Patent No. 7,016,603.
Response to Final Office Action dated Aug. 25, 2005, in U.S. Appl. No. 10/306,759, filed Nov. 26, 2002, now U.S. Patent No. 7,016,603.
Notice of Allowability mailed Sep. 16, 2005, in U.S. Appl. No. 10/306,759, filed Nov. 26, 2002, now U.S. Patent No. 7,016,603.
312 Amendment dated Oct. 10, 2005, in U.S. Appl. No. 10/306,759, filed Nov. 26, 2002, now U.S. Patent No. 7,016,603.
Related U.S. Appl. No. 12/104,950, filed Apr. 17, 2008, entitled "Wireless Communication System and Method for Photographic Flash Synchronization."
Office Action mailed Dec. 31, 2009, in related U.S. Appl. No. 12/104,950, filed Apr. 17, 2008.
Response to Office Action filed Feb. 1, 2010, in related U.S. Appl. No. 12/104,950, filed Apr. 17, 2008.
Notice of Allowance mailed Mar. 23, 2010, in related U.S. Appl. No. 12/104,950, filed Apr. 17, 2008.
U.S. Appl. No. 12/705,096, Aug. 8, 2012, Notice of Allowance.
U.S. Appl. No. 12/705,052, Sep. 5, 2012, Notice of Allowance.
U.S. Appl. No. 13/438,500, Sep. 14, 2012, Response to Office Action.
U.S. Appl. No. 13/438,500, Sep. 14, 2012, Terminal Disclaimers.
EP1177995.5, EP, Aug. 23, 2012, First Examination Report.
EP10741797, EP, Aug. 23, 2012, Extended European Search Report.
PocketWizard MultiMAX Transceiver New Trigger Control Software Features, by LPA Design, Feb. 10, 2001; pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Declaration of James E. Clark filed on Feb. 18, 2005 in U.S. Appl. No. 10/306,759.
U.S. Appl. No. 10/306,759, dated Aug. 29, 2003, Office Action, Now U.S. Patent No. 7,016,603.
U.S. Appl. No. 10/306,759, dated Dec. 18, 2003, Response to Office Action, Now U.S. Patent No. 7,016,603.
U.S. Appl. No. 10/306,759, dated Dec. 24, 2003, Examiner Interview Summary, now U.S. Patent No. 7,016,603.
U.S. Appl. No. 10/306,759, dated Mar. 27, 2004, Final Office Action, Now U.S. Patent No. 7,016,603.
U.S. Appl. No. 10/306,759, dated Apr. 15, 2004, Examiner Interview Summary, Now U.S. Patent No. 7,016,603.
U.S. Appl. No. 10/306,759, dated Apr. 20, 2004, Response to Final Office Action, Now U.S. Patent No. 7,016,603.
U.S. Appl. No. 10/306,759, dated Aug. 24, 2004, Office Action, Now U.S. Patent No. 7,016,603.
U.S. Appl. No. 10/306,759, dated Feb. 18, 2005, Request for Continued Examination, Now U.S. Patent No. 7,016,603.
U.S. Appl. No. 10/306,759, dated Mar. 29, 2005, Office Action, Now U.S. Patent No. 7,016,603.
U.S. Appl. No. 10/306,759, dated Apr. 14, 2005, Response to Office Action, Now U.S. Patent No. 7,016,603.
U.S. Appl. No. 10/306,759, dated Jun. 29, 2005, Final Office Action, Now U.S. Patent No. 7,016,603.
U.S. Appl. No. 10/306,759, dated Aug. 25, 2005, Response to Final Office Action, Now U.S. Patent No. 7,016,603.
U.S. Appl. No. 10/306,759, dated Sep. 16, 2005, Notice of Allowance, Now U.S. Patent No. 7,016,603.
U.S. Appl. No. 10/306,759, dated Oct. 18, 2005, 312 Amendment, Now U.S. Patent No. 7,016,603.
U.S. Appl. No. 10/306,759, dated Dec. 20, 2005, Response to 312 Amendment, Now U.S. Patent No. 7,016,603.
U.S. Appl. No. 10/306,759, dated Jan. 4, 2006, Response to 312 Amendment, Now U.S. Patent No. 7,016,603.
U.S. Appl. No. 10/306,759, dated Nov. 18, 2006, Certificate of Correction, Now U.S. Patent No. 7,016,603.
U.S. Appl. No. 11/305,668, dated Mar. 8, 2006, Office Action, Now U.S. Patent No. 7,133,607.
U.S. Appl. No. 11/305,668, dated Jun. 8, 2006, Response to Office Action, Now U.S. Patent No. 7,133,607.
U.S. Appl. No. 11/305,668, dated Jun. 13, 2006, Supplemental Response to Request for Clarification by the Examiner, Now U.S. Patent No. 7,133,607.
U.S. Appl. No. 11/305,668, dated Jun. 30, 2006, Notice of Allowance, Now U.S. Patent No. 7,133,607.
U.S. Appl. No. 11/305,668, dated Mar. 29, 2007, Request for Correction of Letters Patent, Now U.S. Patent No. 7,133,607.
U.S. Appl. No. 11/529,203, dated Aug. 14, 2007, Office Action, Now U.S. Patent No. 7,362,965.
U.S. Appl. No. 11/529,203, dated Oct. 16, 2007, Terminal Disclaimer, Now U.S. Patent No. 7,362,965.
U.S. Appl. No. 11/529,203, dated Oct. 16, 2007, Response to Office Action, Now U.S. Patent No. 7,362,965.
U.S. Appl. No. 11/529,203, dated Oct. 25, 2007, Terminal Disclaimer, Now U.S. Patent No. 7,362,965.
U.S. Appl. No. 11/529,203, dated Dec. 14, 2007, Notice of Allowance, Now U.S. Patent No. 7,362,965.
U.S. Appl. No. 12/104,950, dated Dec. 31, 2009, Office Action, Now U.S. Patent No. 7,764,875.
U.S. Appl. No. 12/104,950, dated Feb. 1, 2010, Response to Office Action, Now U.S. Patent No. 7,764,875.
U.S. Appl. No. 12/104,950, dated Mar. 23, 2010, Notice of Allowance, Now U.S. Patent No. 7,764,875.
U.S. Appl. No. 12/843,254, dated Jul. 27, 2010, Preliminary Remarks, Now U.S. Patent No. 8,121,468.
U.S. Appl. No. 12/843,254, dated Aug. 25, 2011, Office Action, Now U.S. Patent No. 8,121,468.
U.S. Appl. No. 12/843,254, dated Aug. 25, 2011, Response to Office Action, Now U.S. Patent No. 8,121,468.

U.S. Appl. No. 12/843,254, dated Aug. 25, 2011, Terminal Disclaimer, Now U.S. Patent No. 8,121,468.
U.S. Appl. No. 12/843,254, dated Nov. 28, 2011, Notice of Allowance, Now U.S. Patent No. 8,121,468.
U.S. Appl. No. 13/399,333, dated Jun. 14, 2012, Office Action.
U.S. Appl. No. 11/488,491, dated Oct. 16, 2007, Office Action.
U.S. Appl. No. 11/490,322, dated Apr. 20, 2010, Office Action, Now U.S. Patent No. 7,880,761.
U.S. Appl. No. 11/490,322, dated Jul. 12, 2010, Response to Office Action, Now U.S. Patent No. 7,880,761.
U.S. Appl. No. 11/490,322, dated Sep. 15, 2010, Notice of Allowance, Now U.S. Patent No. 7,880,761.
U.S. Appl. No. 11/697,241, dated Nov. 8, 2007, Office Action, U.S. Patent No. 7,437,063.
U.S. Appl. No. 11/697,241, dated Mar. 10, 2008, Response to Office Action, Now U.S. Patent No. 7,437,063.
U.S. Appl. No. 11/697,241, dated Mar. 24, 2008, Examiner Interview Summary, Now U.S. Patent No. 7,437,063.
U.S. Appl. No. 11/697,241, dated Jun. 9, 2008, Notice of Allowance, Now U.S. Patent No. 7,437,063.
U.S. Appl. No. 12/250,914, dated Jun. 12, 2009, Office Action, Now U.S. Patent No. 7,702,228.
U.S. Appl. No. 12/250,914, dated Jun. 29, 2009, Response to Office Action and Terminal Disclaimer, Now U.S. Patent No. 7,702,228.
U.S. Appl. No. 12/250,914, dated Oct. 28, 2009, Terminal Disclaimer, Now U.S. Patent No. 7,702,228.
U.S. Appl. No. 12/250,914, dated Dec. 3, 2009, Notice of Allowance, Now U.S. Patent No. 7,702,228.
U.S. Appl. No. 12/762,811, dated Dec. 28, 2010, Office Action, Now U.S. Patent No. 7,970,267.
U.S. Appl. No. 12/762,811, dated Mar. 28, 2011, Response to Office Action, Now U.S. Patent No. 7,970,267.
U.S. Appl. No. 12/762,811, dated Mar. 28, 2011, Terminal Disclaimer, Now U.S. Patent No. 7,970,267.
U.S. Appl. No. 12/762,811, dated Apr. 20, 2011, Notice of Allowance, Now U.S. Patent No. 7,970,267.
U.S. Appl. No. 13/169,413, dated Dec. 20, 2011, Office Action, Now U.S. Patent No. 8,180,210.
U.S. Appl. No. 13/169,413, dated Jan. 16, 2012, Response to Office Action, Now U.S. Patent No. 8,180,210.
U.S. Appl. No. 13/169,413, dated Jan. 16, 2012, Terminal Disclaimers, Now U.S. Patent No. 8,180,210.
U.S. Appl. No. 13/169,413, dated Mar. 22, 2012, Notice of Allowance, Now U.S. Patent No. 8,180,210.
U.S. Appl. No. 13/438,500, dated Jun. 18, 2012, Office Action.
U.S. Appl. No. 12/129,447, dated Apr. 12, 2010, Notice of Allowance, Now U.S. Patent No. 7,775,575.
U.S. Appl. No. 12/129,447, dated Apr. 12, 2010, Examiner Amendment, Now U.S. Patent No. 7,775,575.
U.S. Appl. No. 12/129,402, dated Apr. 19, 2010, Notice of Allowance, Now U.S. Patent No. 7,783,188.
U.S. Appl. No. 12/861,445, dated Sep. 30, 2010, Notice of Allowance, Now U.S. Patent No. 7,885,533.
U.S. Appl. No. 13/021,951, dated Nov. 25, 2011, Notice of Allowance.
U.S. Appl. No. 13/021,951, dated Feb. 13, 2012, Withdrawal of Notice of Allowance.
U.S. Appl. No. 13/021,951, dated Feb. 22, 2012, Office Action.
U.S. Appl. No. 13/253,596, dated Nov. 30, 2011, Office Action.
U.S. Appl. No. 13/253,596, dated Feb. 29, 2012, Response to Office Action.
U.S. Appl. No. 13/253,596, dated May 9, 2012, Final Office Action.
U.S. Appl. No. 12/705,052, dated Mar. 27, 2012, Office Action.
U.S. Appl. No. 12/705,052, dated Jun. 27, 2012, Response to Office Action.
U.S. Appl. No. 12/705,096, dated Mar. 12, 2012, Office Action.
U.S. Appl. No. 12/705,096, dated Jun. 12, 2012, Response to Office Action.
U.S. Appl. No. 12/705,164, dated Mar. 29, 2012, Office Action.
U.S. Appl. No. 12/705,164, dated Jun. 29, 2012, Response to Office Action.
PCT/US2003/37271, WO, May 12, 2004, International Search Report.
PCT/US2007/066162, WO, Nov. 9, 2007, International Search Report and Written Opinion.
PCT/US2008/065139, WO, Sep. 25, 2008, International Search Report and Written Opinion.
PCT/US2008/065137, WO, Sep. 25, 2008, International Search Report and Written Opinion.
PCT/US2010/024108, WO, Sep. 2, 2010, International Search Report and Written Opion.
PCT/US2010/024195, WO, Sep. 16, 2010, International Search Report and Written Opinion.
PCT/US2012/025915, WO, Jun. 8, 2012, International Search Report and Written Opinion.
PCT/US2011/044008, WO, Nov. 17, 2011, International Search Report and Written Opinion.
2007-80020420.4, CN, Jun. 13, 2010, Chinese Office Action.
2010-10600736.4, CN, Feb. 7, 2012, Chinese Office Action.
EP07760263.9, EU, Jan. 4, 2011, European Search Report.
EP07760263.9, EP, Jul. 27, 2011, Response to European Search Report.
EP8756458.9, EP, Jul. 22, 2011, European Search Report.
EP11177995.5, EP, Dec. 12, 2011, European Search Report.
EP11177995.5, EP, Jul. 11, 2012, Response to European Search Report.
EP11177997.1, EP, Dec. 13, 2012, European Search Report.
U.S. Appl. No. 13/016,435, filed Jan. 28, 2011.
U.S. Appl. No. 13/438,500, filed Apr. 3, 2012.
U.S. Appl. No. 13/021,951, filed Feb. 7, 2011.
U.S. Appl. No. 13/253,596, filed Oct. 5, 2011.
U.S. Appl. No. 13/201,182, filed Aug. 11, 2011.
U.S. Appl. No. 13/201,185, filed Aug. 11, 2011.
U.S. Appl. No. 13/201,281, filed Aug. 12, 2011.
U.S. Appl. No. 13/208,686, filed Aug. 12, 2011.
U.S. Appl. No. 13/208,706, filed Aug. 12, 2011.
U.S. Appl. No. 13/401,175, filed Feb. 21, 2012.
U.S. Appl. No. 12/705,052, filed Feb. 12, 2010.
U.S. Appl. No. 12/705,096, filed Feb. 12, 2010.
U.S. Appl. No. 12/705,164, filed Feb. 12, 2010.

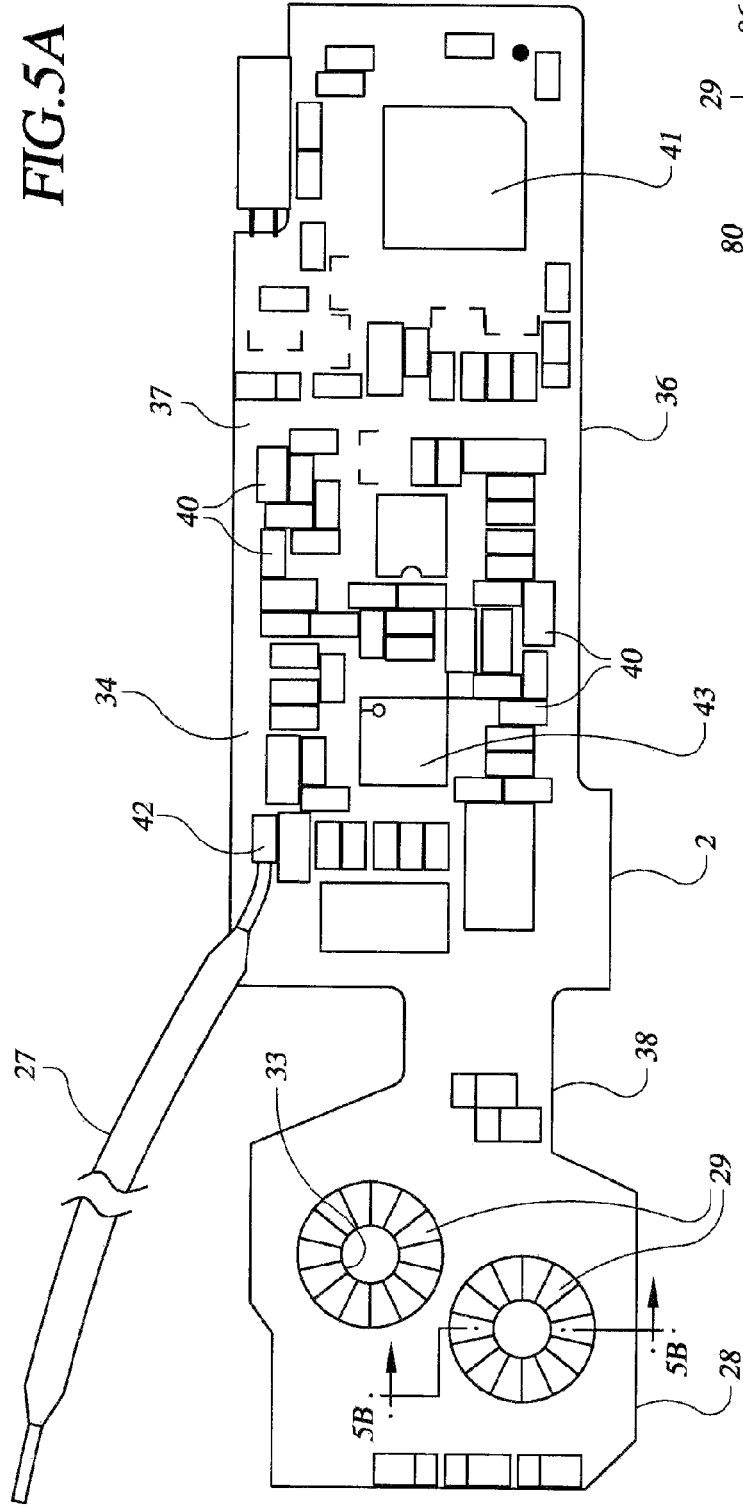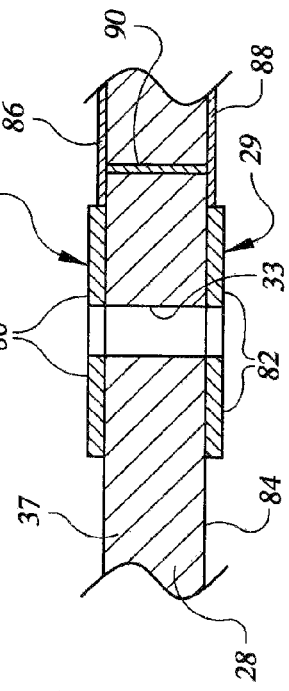

WIRELESS COMMUNICATION SYSTEM AND METHOD FOR PHOTOGRAPHIC FLASH SYNCHRONIZATION

RELATED APPLICATION DATA

This application is a continuation of U.S. patent application Ser. No. 12/843,254, filed Jul. 26, 2010, entitled "Wireless Communication System and Method for Photographic Flash Synchronization," now U.S. Pat. No. 8,121,468, which is a continuation of U.S. patent application Ser. No. 12/104,950, filed Apr. 17, 2008, entitled "Wireless Communication Activation System and Method for Photographic Flash Synchronization," now U.S. Pat. No. 7,764,875, which is a continuation of U.S. patent application Ser. No. 11/529,203, filed Sep. 27, 2006, entitled "Wireless Communication Activation System and Method," now U.S. Pat. No. 7,362,965, which is a continuation of U.S. patent application Ser. No. 11/305,668, filed Dec. 16, 2005, entitled "Wireless Communication Activation System and Method," now U.S. Pat. No. 7,133,607, which is a continuation of U.S. patent application Ser. No. 10/306,759, filed Nov. 26, 2002, entitled "Wireless Communication Module," now U.S. Pat. No. 7,016,603, each of which is incorporated herein by reference in its entirety.

FIELD OF THE INVENTION

The present invention relates generally to the field of wireless communication. More particularly, the present invention is directed to a wireless communication system and method for photographic flash synchronization.

BACKGROUND

In the field of photography, remote lighting for photography can be difficult, especially for outdoor shots. Photographing a building or other outdoor scene presents a significant challenge when the lights must be close to the building or scene and the camera must be further away to take in the entire building or scene. In certain situations, cables are used for remote photography lighting. However, because it is typically illegal to string cables across a public street, the use of cable is often not practical. Even if it is possible to use cables, it is not preferred because they are heavy, unwieldy, and tangle easily. In addition, the cables must be hidden from view in the photograph.

As a result of the difficulties encountered using cables with remote photography lighting, various remote control devices utilizing multiple wireless technologies have been developed to remotely control photography equipment such as flashpacks and secondary cameras. Infrared (IR), cellular, light pulse, and radio frequency (RF) are some examples of wireless technologies employed in prior art devices. One particularly effective system is the PocketWizard® MultiMAX™ designed by Lab Partners Associates Inc. of South Burlington, Vt. The PocketWizard® MultiMAX™ is an intelligent device that utilizes RF technology with a fully programmable transceiver. Much of the technology incorporated in the design of the PocketWizard® MultiMAX™ is disclosed in U.S. Pat. No. 5,359,375, which is incorporated by reference as if fully disclosed herein, issued to Clark on Oct. 25, 1994.

Typically, prior art devices require the connection of a transmitter, receiver, or transceiver to the exterior of a camera. The attachment of a transmitter, receiver, or transceiver to the exterior of a camera or other device increases the weight of the device and can make the device difficult to handle. In addition, the attached device is often easily damaged. However, the only way to provide existing devices that were not originally designed to include remote control functionality with such functionality is to attach a transmitter, receiver, or transceiver to the exterior of the device. Thus, in order to provide remote control functionality to existing devices, a separate transmitter, receiver, or transceiver must be attached to the exterior of the device body as in the example of a camera described previously.

SUMMARY OF THE DISCLOSURE

In one implementation, a method for controlling one or more remote photographic flash devices from a camera body is provided. The method includes electrically receiving a flash synchronization signal internal to a camera body including metal; using the flash synchronization signal to generate within the camera body an RF signal; communicating the RF signal via a wired connection to an antenna external to the camera body; and wirelessly communicating the RF signal from the external antenna to the one or more remote photographic flash devices.

In another implementation, a system for controlling one or more remote photographic flash devices from a camera is provided. The system includes a camera body having wireless communication circuitry within the camera body that does not interfere with the camera body functioning as a camera, the camera body including metal; an electrical pathway operatively connecting the wireless communication circuitry to a control of the camera providing a flash synchronization signal, the wireless communication circuitry configured to generate an RF signal in response to receiving a flash synchronization signal; and an antenna element external to the camera body, the antenna element connected via a wired connection to the wireless communication circuitry, the wireless communication circuitry configured to communicate the RF signal to the antenna element for wireless communication to the one or more remote photographic flash devices.

In yet another implementation, a system for controlling one or more remote devices from a camera is provided. The system includes a camera body having one or more camera controls, the camera body including metal; a wireless communication circuitry within the camera body and operatively connected to at least one of the one or more camera controls; an external antenna element connected via a wired connection to the wireless communication circuitry, the wireless communication circuitry configured to communicate a signal to the antenna element for RF wireless communication to one or more remote devices; and one or more remote devices associated with a wireless receiver for receiving the signal.

Other features, utilities and advantages of various embodiments of the invention will be apparent from the following more particular description of embodiments of the invention as illustrated in the accompanying drawings.

BRIEF DESCRIPTION OF THE DRAWINGS

For the purpose of illustrating the invention, the drawings show one or more forms of the invention. However, it should be understood that the present invention is not limited to the precise arrangements and instrumentalities shown in the drawings, wherein:

FIG. 5A is a top plan view of one embodiment of the wireless communication module of the present invention;

FIG. 5B is a partial side section view taken along line 5B-5B of FIG. 5A;

DETAILED DESCRIPTION

The wireless communication module of the present invention adds wireless control functionality to existing devices, for example cameras. The module is inserted in a device that was originally designed without, or with different, remote control functionality. A device including the module can remotely operate other devices using the existing controls of the device. The module enables a user to remotely operate external devices without any cables running back to the device. It also allows a user to remotely operate other devices that include the wireless communication module.

In one embodiment, the module is installed in a camera and is used to add wireless flashpack and wireless camera controls to the camera. The module permits a user to remotely fire flashpacks without any cables running back to the camera. In addition, a camera including a wireless communication module may be remotely controlled and/or programmed by another camera including a module and vice versa. Depending upon the control command sent, a module inserted in one camera could also be used to remotely change the shutter speed or some other setting of a second camera containing a module.

Figure 1:
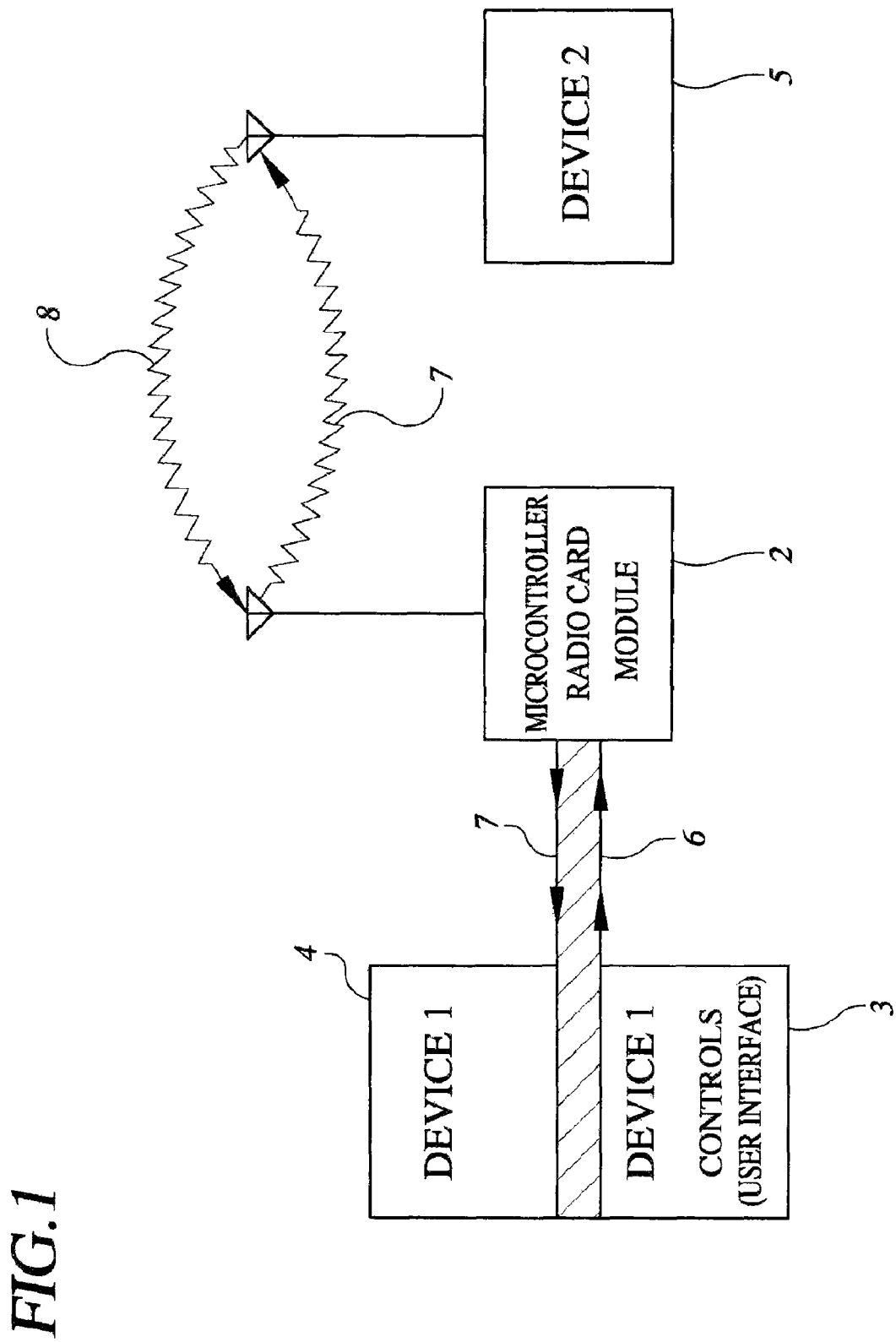
FIG. 1 is a block diagram that shows the flow of signals within one embodiment of the wireless communication module of the present invention.

Referring to FIG. 1, wireless communication module 2 serves as an intermediary device between the controls 3 of a first device 4, the first device, and one or more remote devices 5. FIG. 1 is a block diagram that illustrates the general flow of communication signals in module 2. In operation, module 2 intercepts signals 6 as they flow from controls 3 of first device 4 to other elements of the first device (e.g, signals generated from user interface inputs). Next, module 2 translates signals 6 and generates corresponding signals 7 in response to signals 6 received from first device 4. The corresponding signals 7 are transmitted to remote devices 5 via a transmitter, transceiver, or similar mechanism and or back to first device 4 itself.

Module 2 may also receive signals 8 from remote device 5 via a receiver (not shown). In receiver mode, module 2 translates signals 8 and generates corresponding signals 7 to send to first device 4.

Figure 2:
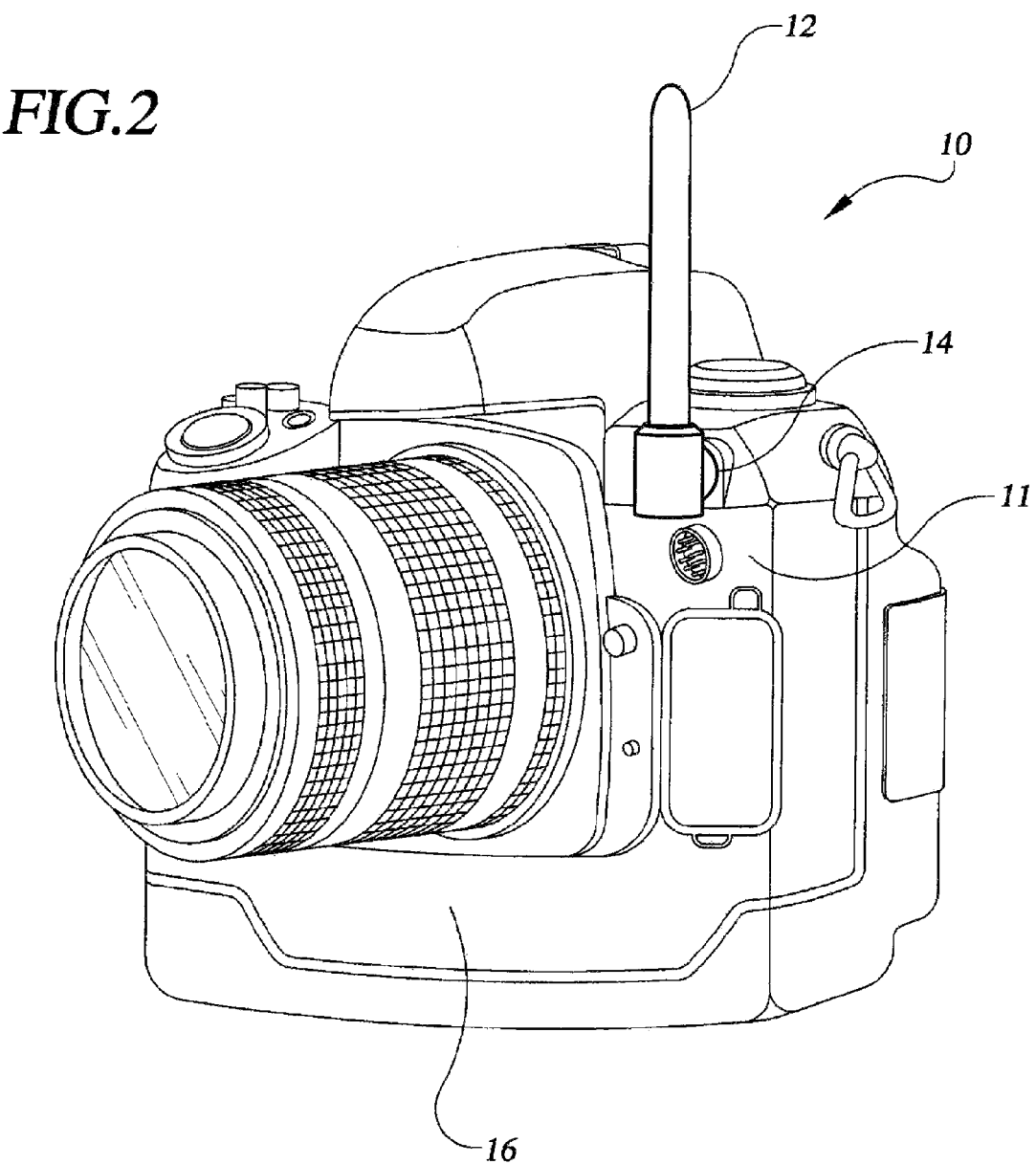
FIG. 2 is a front right isometric view of a camera containing one embodiment of the wireless communication module of the present invention including a removably attachable antenna connected to the PC connector port on the camera.
Figure 3:
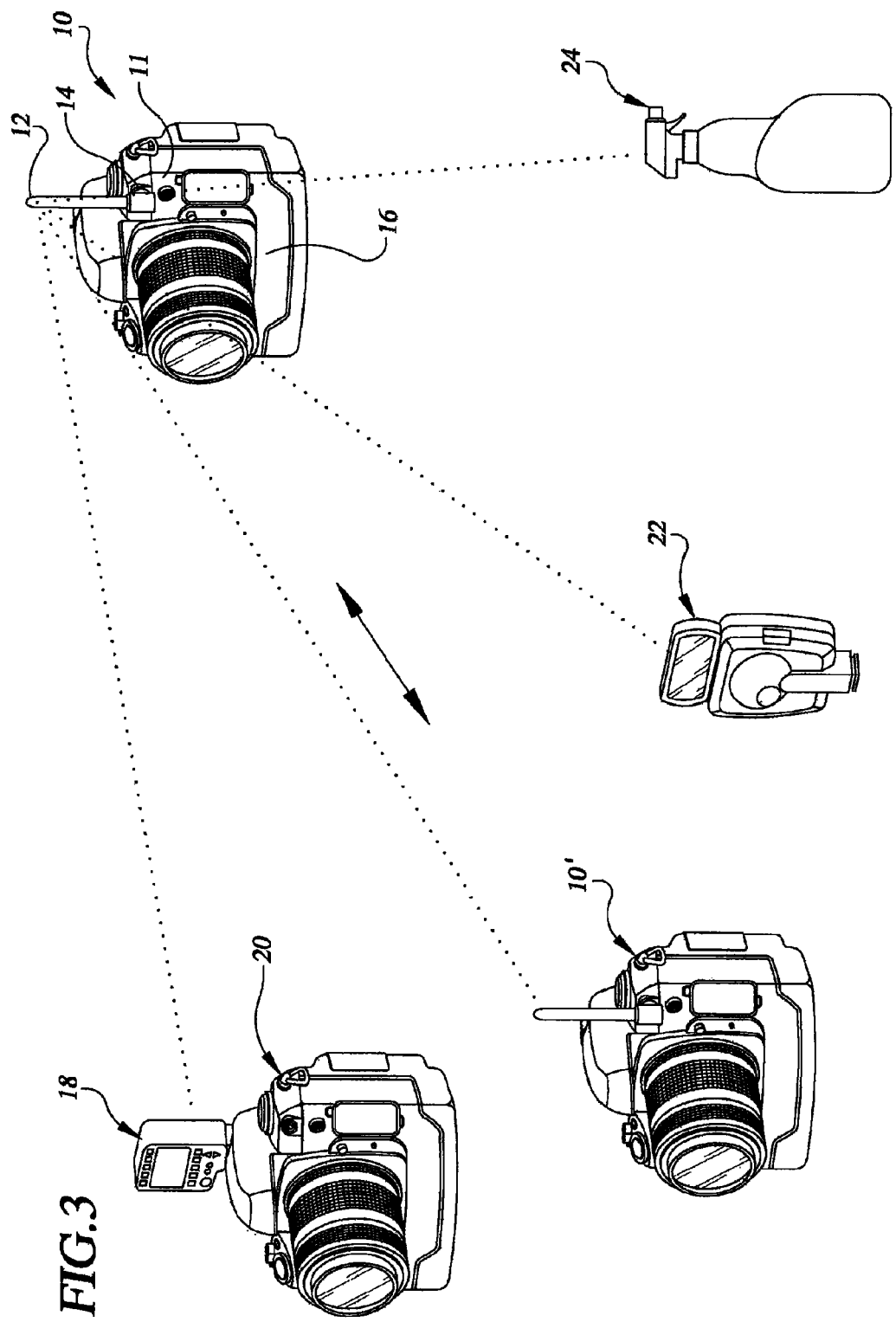
FIG. 3 is a perspective view of a camera including one embodiment of the wireless communication module of the present invention and devices that typically communicate with the module.

FIGS. 2-3 illustrate a camera 10 including one embodiment of the wireless communication module 2 of the present invention. Notably, the wireless communication module 2 resides entirely within the housing 11 of camera 10. As illustrated in FIG. 2, the only feature that allows one to detect the presence of the wireless communication module 2 within camera 10 is the presence of an external antenna 12 connected to a PC connector 14 on the face 16 of the camera. As described more fully below, when module 2 is not in use, antenna 12 may be detached thereby removing structural signs indicating the presence of a wireless communication module 2 within camera housing 11. When module 2 is not in use, camera 10 will generally function normally but without wireless communication functionality.

FIG. 3 illustrates typical devices that may communicate with wireless communication module 2 of the present invention installed in housing 11 of camera 10. One such device is a receiver device 18 that can be attached to the exterior of a camera 20 that does not include the module thereby allowing camera 10 to control certain functions of camera 20. Alternatively, receiver device 18 may be connected to a remote flash device or flashpack 22. In the instance where a flashpack 22 has either a wireless communication module 2 installed therein, or other receiving means installed therein, camera 10 may communicate directly with a flashpack 22.

Two or more cameras having wireless communication module 2 may communicate with one another. A user can send and receive messages between two cameras 10 and 10 having modules 2 thereby allowing a user to wirelessly trigger either of the two cameras using the controls of the other camera. A user will also be able to alter the settings of one camera using the controls of another camera wirelessly.

Wireless communication module 2 can also be used to wirelessly communicate with other external devices such as a spray bottle 24 or other mechanical device that includes reception capabilities. In the example of a camera 10 outfitted with module 2, the ability to actuate external devices such as spray bottles or other mechanical devices wirelessly may be beneficial to photographers trying to precisely capture events related to the external device. For example, a photographer might want to capture an image of vapor droplets as they exit the nozzle of a spray bottle. As one can recognize, the ability to precisely control the time that the vapor droplets exit the nozzle will enable a user to more precisely capture the image of those droplets. Although the examples described herein are in relation to a camera, one skilled in the art will recognize that wireless communication module 2 can also be used in myriad devices other than cameras to provide such devices with wireless communication functionality.

Figure 4:
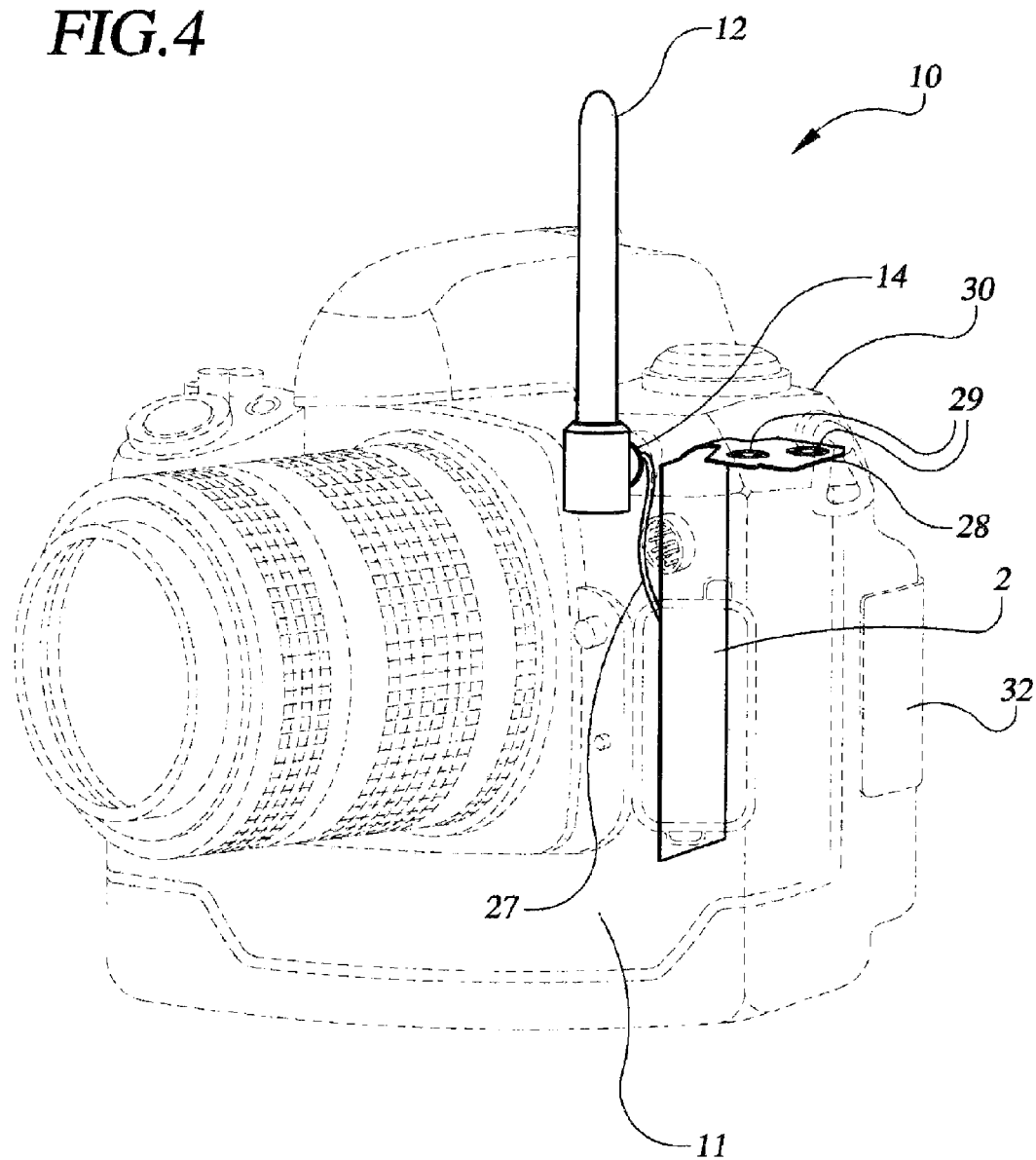
FIG. 4 is a phantom front isometric view of a typical camera that shows the positioning of one embodiment of the wireless communication module of the present invention and associated detachable antenna.

FIGS. 4-6 illustrate one embodiment of wireless communication module 2 as installed in camera 10. Module 2 typically resides within camera housing 11 on the side of the housing adjacent PC connector 14. Removable antenna 12, which is removably attachable to PC connector 14, is adapted for use with module 2 and transmits signals to and from the module via a connection 27 between the module and the PC connector. Module 2 includes a head portion 28 that contains two substantially circular flex connectors 29. When installed in camera 10, head portion 28 is folded over so that it is substantially perpendicular to the remaining portions of module 2. In certain cameras (such as a Nikon® D1), the screws (not shown) that both connect upper portion 30 of camera housing 11 to lower portion 32 of the camera housing serve as a path for electrical signals between the camera controls housed in the upper portion of the camera housing and the mechanical controls housed in the lower portion of the camera housing. Module 2 takes advantage of this functionality by providing apertures 33 in flex connectors 29. When the screws used to secure together upper portion 30 and lower portion 32 are received in apertures 33, flex connectors 29 permit wireless communication module 2 to intercept the electronic signals transferred between the camera controls and the mechanical controls in camera 10. In cameras that do not utilize body screws as a conduit for electrical signals, module 2 may be more directly connected to the camera controls using any appropriate means including soldered connections or otherwise.

FIG. 5A is a top plan view of one embodiment of wireless communication module 2 similar to that installed in camera 10 of FIG. 4. Generally, module 2 is defined by a base 34, typically a circuit board that includes three main portions: a substantially rectangular body portion 36; a narrow throat or neck portion 38; and, as noted above, a substantially square head portion 28. In at least one embodiment, base 34 is a 6-layer ridged flex circuit board. This embodiment has many ground layers to keep all digital signals clean and isolated from the RF signals.

Surface 37 of body portion 36 typically includes module microchips 40 and other electrical connections. Microchips 40 and other electrical connections typically include at least a central processing unit (CPU) 41, module controls 42, and a transmitter, receiver, or transceiver chip 43 to provide wireless communication capabilities within module 2, as described in more detail below. Although the entire module 2, illustrated in FIG. 5A, is typically fabricated of a non-rigid material, throat 38 and head portions 28 are particularly flexible to allow the head portion to be bent at a substantially perpendicular angle to body portion 36. Connection 27 is also joined with module controls 42 on one end and with PC connector 14 at the other end thereby providing the aforementioned electrical connection between module 2 and antenna 12 connected to PC connector 14.

Module 2 is substantially rectangular in shape as illustrated in FIG. 5A. One skilled in the art, however, will recognize that module 2 can be developed in virtually any shape to fit the specific geometrical constraints of the device in which it is located.

FIG. 5B is a partial side section view of one flex connector 29. The latter includes electrical contacts 80 and 82 provided on top surface 37 and bottom surface 84 of head portion 28. In addition, electrical connectors 86 and 88 are also formed on top and bottom surfaces 37 and 84. Electrical connectors 86 and 88 electrically connect contacts 80 and 82, respectively, with other areas on base 34. In at least one embodiment, a contact relay 90 that connects relays 86 and 88 may also be present in base 34. In an embodiment without contact relay connect 90, signals intercepted by contact 80 may be processed separately from signals intercepted by contact 82, and vice versa.

In operation, contacts 80 and or contacts 82 may intercept signals from the controls of device 4. The intercepted signals are sent via relays 86 and 88 to CPU 41 of module 2 and then returned to the device and or transmitted to a remote device via transceiver 43.

Figure 6A:
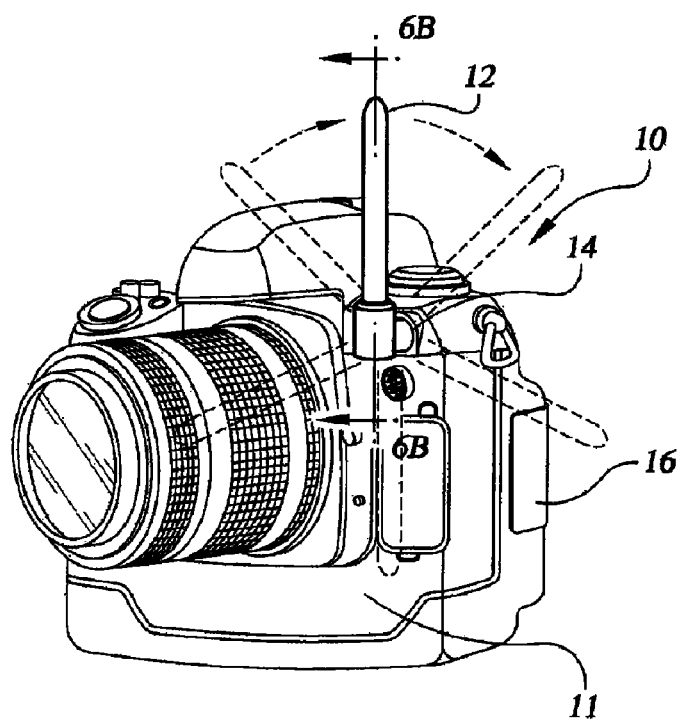
FIG. 6A is similar to FIG. 2, except that it shows the placement and range of motion of an antenna when installed in the PC connector port of a camera.
Figure 6B:
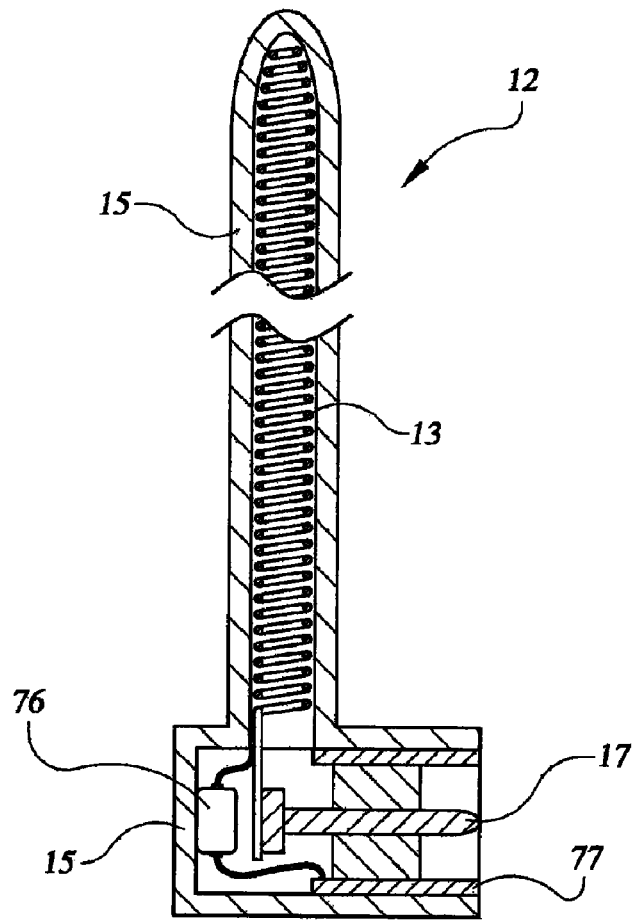
FIG. 6B is a side section view taken along line 6B-6B of FIG. 6A.

FIG. 6A-6B illustrate antenna 12 and its connection to PC connector 14. In one embodiment, antenna 12 is a copper-plated coiled spring 13 covered with a thin molded rubber cover 15 for protection. The exposed end of the copper-plated coiled spring is soldered to a male PC connector 17 before molding.

Antenna 12 is very easily connected to camera 10 by simply plugging the antenna into PC connector 14 on face 11 of the camera. As indicated by the dashed lines in FIG. 6A, antenna 12 is rotatably joined with PC connector 14. Such a connection allows a user flexibility in positioning antenna 12 at the most effective location for transmitting and receiving signals and allows the antenna to be positioned so as to accommodate the user's handling of the camera.

When not using the wireless transmission functionality of wireless communication module 2, antenna 12 can easily be removed from PC connector 14. Conversely, antenna 12 can be re-attached to PC connector 14 just as easily when the functionality of the wireless communication module is desired.

As mentioned above, and illustrated in FIG. 7, the wireless communication module of the present invention includes a central processing unit (CPU) 41. A CPU used in one embodiment of the invention is an in-system programmable microcontroller manufactured by Atmel of San Jose, Calif. and identified by model number AT90S8515. Other logic devices may also be satisfactorily employed as CPU 41. CPU 41 includes firmware for communicating with the camera controls. As described herein, reference will be made to actions taken by CPU 41. As one skilled in the art understands, the firmware program stored within CPU 41 is actually responsible for dictating the operations performed by the CPU.

Figure 7:
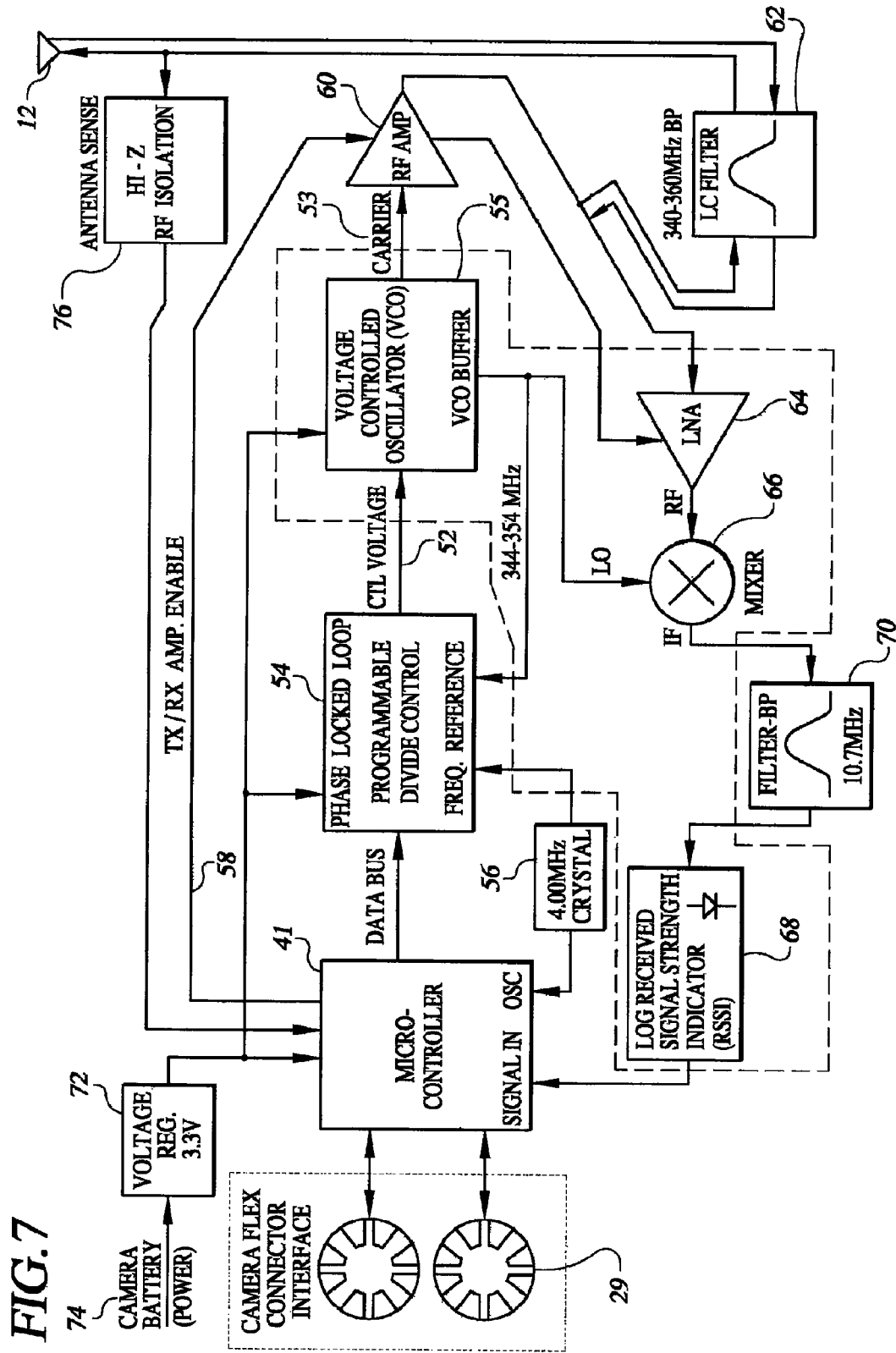
FIG. 7 is a block diagram that shows the elements of one embodiment of the wireless communication module of the present invention and associated elements of the camera with which the module is connected.

FIG. 7 illustrates the flow of data and the interaction between the controls of camera 10 and one embodiment of module 2 via the flex connector 29, CPU 41, and external devices via antenna 12. In this particular embodiment, module 2 includes a transceiver chip 43 or equivalent device capable of transmitting and receiving RF signals used in the communication of information between a camera 10 including module 2 and other devices such as a flashpack 22 (FIG. 3). A suitable transceiver chip 43 is manufactured by RF Micro Devices, Inc. of Greensboro, N.C., and is identified by model number RF2915. Although RF signals are utilized in one particular embodiment, the present invention encompasses all wireless communication technologies including cellular and infrared technologies.

In one embodiment, in transmission mode, transceiver chip 43 (indicated by dashed line in FIG. 7) of module 2 uses on/off keying (OOK) of a reference signal provided via line 52 that can be programmed anywhere between 344.04 MHz and 354.04 MHz with both 15 us and 25 us bit times (i.e., time it takes to transfer one bit) as its signaling means. Of course in other embodiments, phase shift keying (PSK) or frequency shift keying (FSK) may be used instead of OOK. The reference signal on line 52 is derived from a phase lock loop (PLL) 54 circuit that is controlled from CPU 41. A single 4.000 MHz crystal 56 is used both to provide reference input to CPU 41 and as the reference clock for PLL 54. CPU 41 sends a transmission enable signal along line 58 to start transmission of signals. PLL 54 has a lock detect output (not shown) that is monitored by CPU 41 to ensure reference signal 52 is on frequency before transmission is enabled.

PLL 54 sends the reference signal and line 52 to a voltage controlled oscillator (VCO) 55 connected to PLL 54. VCO 55 develops a signal carrier from the reference signal and sends the signal carrier on line 53 to a power amp 60. Power amp 60 amplifies the RF signal carried by the signal carrier.

In operation, when a trigger (i.e., a sync pulse) comes in from camera 10, via flex connector 29, CPU 41 enables the transmitter circuit contained in transceiver chip 43. CPU 41 then shifts out a serial command code by modulating a power amp 60 on and off. A logic 1 is represented by carrier on and a logic 0 by carrier off. When amp 60 is powered off during the 0 bits, the signal level drops by about 70 dB. The harmonics are kept low by way of a band pass filter 62 on the output of power amp 60 and by keeping the transmitter amplifier power level about 10 dB below its P1 dB limit. RF output power into antenna 12 is less than −5 dBm.

Every command code is sent twice (or more) with a pause in between. This is to increase reliability and also to keep the average duty cycle low.

In receive mode, CPU 41 enables a low-noise amplifier (LNA) 64 and mixer 66 built into transceiver chip 43. An indicator 68 known as the received signal strength indicator (RSSI) is monitored by the CPU's internal analog comparator to look for proper bit patterns from the transmitter circuit within transceiver chip 43. Band pass filter 70 is positioned between mixer 66 and RSSI 68 for removing unwanted frequencies. PLL 54 is set 10.7 MHz below the frequency that is being monitored. As can be assumed from the previous sentence, the intermediate frequency (IF frequency) is 10.7 MHz. Band pass filters 62 and 70 offer great selectivity to the IF section of transceiver chip 43. When implemented as 230 KHz ceramic band pass filters, filters 62 and 70 provide sensitivity in transceiver chip 43 of about −94 dBm for S/N of 12 dB.

A shield (not shown) is generally provided covering the entire RF section of body section 36 of module 28 to eliminate any signal leakage from PLL 54 to the outside. As the body of camera 10 is typically made of metal, additional shielding is provided. Of course, where the body is not made of metal, additional shielding materials may be provided as necessary.

Module 2 uses a linear voltage regulator IC 72 to maintain 3.3V internal from the camera's batteries 74. In one embodiment, module 2 draws about 13 mA while in receive mode and about 16 mA peak in the transmit mode. When the power switch (not shown) of camera 10 is turned off, module 2 goes into sleep mode where current draw is dropped to about 1 mA. Since a typical camera battery 74 is rated for about 2000 mA-H, module 2 has a very small effect on overall battery drain.

Referring to FIGS. 1, 6B and 7, in one embodiment, module 2 is automatically activated when male connector pin 17 of antenna 12 is attached to PC connector 14. Other activation approaches, e.g., via controls of camera 10, are also encompassed by the present invention. An inductor 76 (FIG. 6B), e.g., a 470 mH inductor in one embodiment of the invention, is connected from antenna 12 to the ground connection (not shown) of PC connector 14 via antenna contact 77 (FIG. 6B). Inductor 76 has an inductance chosen to have a resonance at 350 MHz so that it looks like an open circuit to the RF signal, but presents a short circuit to ground at low DC frequencies. As one skilled in the art will understand, alternate devices such as capacitors, resistors, or similar mechanisms may be used in place of inductor 76. In such embodiments, activation and or deactivation of module 2 may be based on electrical events other than a short circuit (e.g., the measured current across an alternate device). This short circuit is typically detected by CPU 41 and is used to enable or disable radio operation. If the short circuit is not detected by CPU 41, module 2 knows antenna 12 is not connected. Antenna 12 is typically designed to have a resistance of about 50 ohms for easy production testing. As mentioned above, the bodies of many cameras are made of metal alloy, which also makes for a good ground for antenna 12.

Figure 8A:
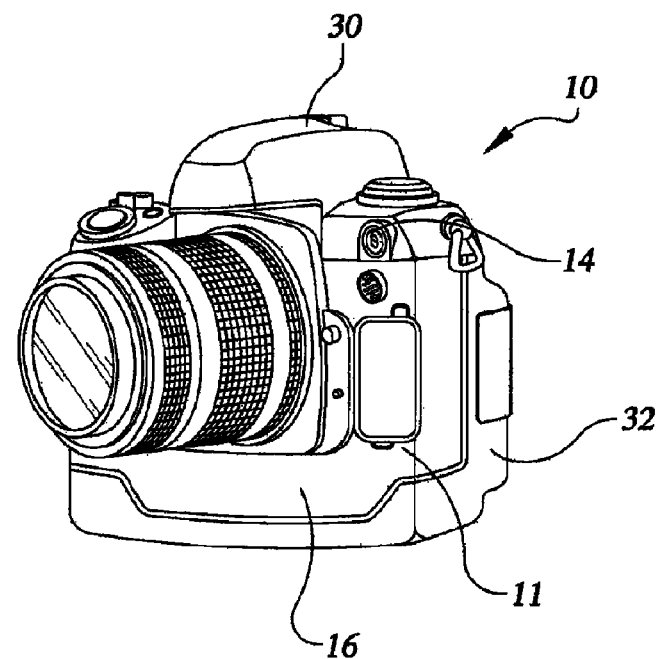
FIGS. 8A-8D are installation drawings showing the various stages of installation of one embodiment of the wireless communication module of the present invention in a camera.
Figure 8B:
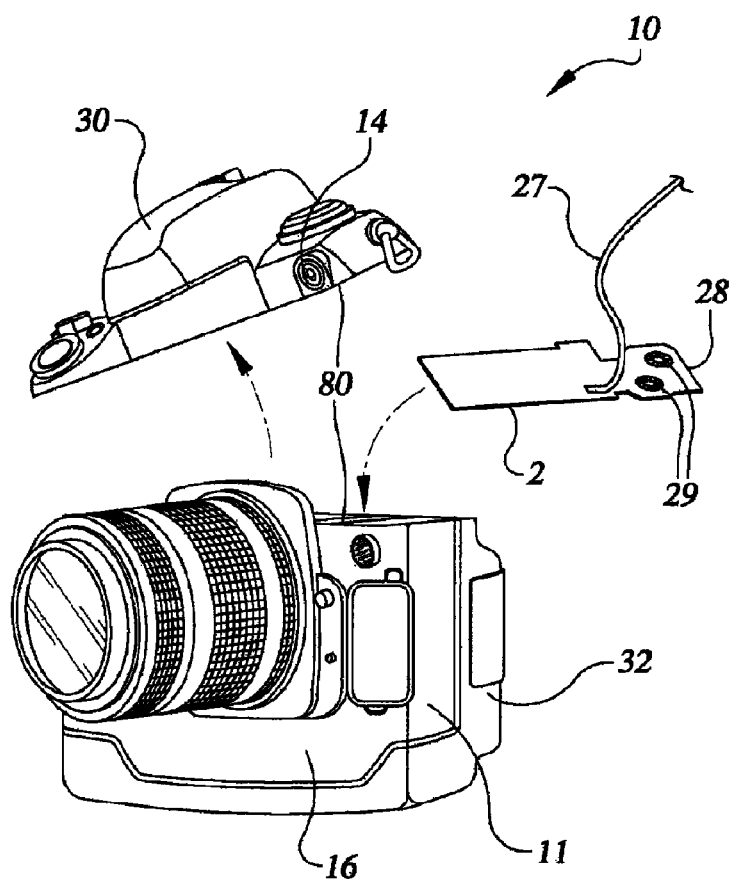
Figure 8C:
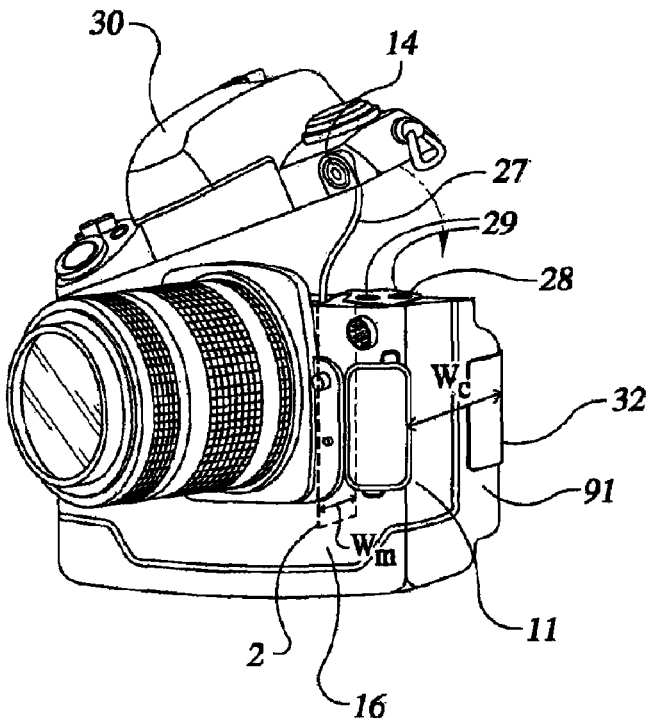

FIGS. 8A-8D illustrate one method of installing module 2 in a camera such as a Nikon D1. FIG. 8A shows camera 10 without module 2 installed. First, upper portion 30 of housing 11 is substantially detached from lower portion 32 of housing 11 thereby exposing the inside 80 of both portions 30, 32.

Next, wireless communication module 2 is inserted into lower portion 32 so that it will reside adjacent PC connector 14 when portions 30, 32 are reconnected. When inserted, top 28 of module 2 is closer to upper portion 30. Additionally, the width (Wm) of module 2 is typically oriented relative to the width (Wc) of a sidewall 91 so that surface 37 of module 2 is co-planar to sidewall 33. Of course, in devices other than the one illustrated in FIGS. 8A-8D, module 2 may be located and oriented in any manner within the device in order to facilitate connection of the module to the particular device's controls.

After insertion of module 2, head portion 28 is folded over so that it is substantially perpendicular to the remaining portions 36, 38 of module 2. At the same time, flex connectors 29 formed in head portion 28 are positioned so apertures 33 are aligned with the female screw holes (not shown) formed on lower portion 32 so that when upper and lower portions 30, 32 are reconnected, the screws joining them together pass through apertures 33 flex connectors 29. As a result, contacts 80 and 82 of flex connector 29 are electrically connected so as to receive camera control signals carried by the camera screws in apertures 33. Soldered connections are typically made to connect camera 10's power supply to module 2 and connect antenna wire 27 to PC connector 14 inside housing 16 of camera 10. Of course, as one skilled in the art will understand, there are myriad ways to connect module 2 to camera 10 other than soldered connections. After module 2 is joined with camera 10, upper portion 30 is reconnected to lower portion 32 thereby enclosing module 2 within body 16 of camera 10.

Figure 8D:
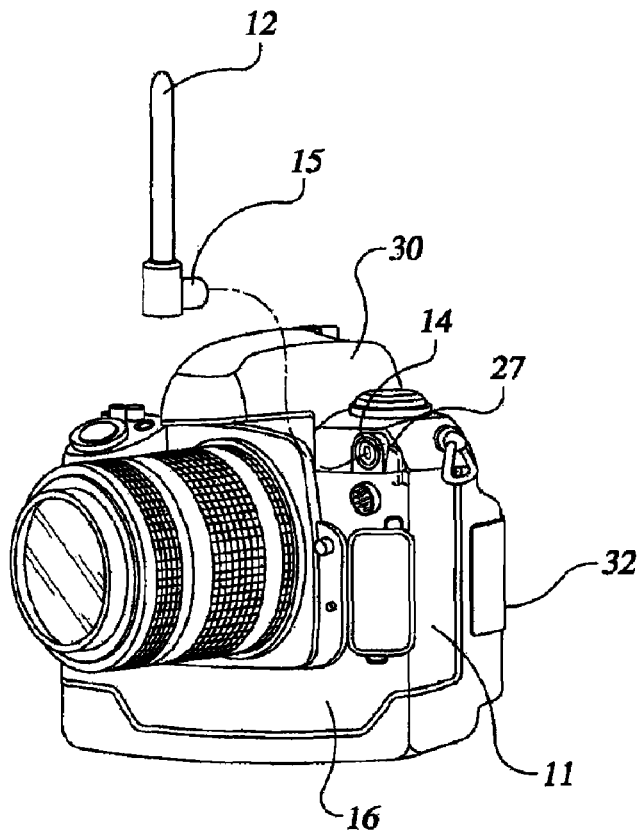

As illustrated in FIG. 8D, in one embodiment, the remote control functionality of module 2 is activated by attaching antenna 12 to PC connector 14 on housing 11 of camera 10, as described above.

As discussed above, in the embodiment illustrated in FIGS. 8A-8D, the screws and screw holes (not shown) that hold upper and lower portions 30 and 32 of camera body 16 together also serve as a communication path for transferring electrical signals between module 2 and the controls of camera 10. However, in other embodiments, screws may not be used to hold a camera's body together and therefore will not be available to serve as a point of connection with module 2. Alternative ways of creating a connection between module 2 and the controls of the device in which it resides are contemplated by the present invention. One such way is the direct connection (via soldering or similar methods of connection) of a wire from the camera controls to module 2.

As described herein, the wireless communication module 2 of the present invention is particularly suited for use with photographic equipment. FIG. 3 shows several different photographic applications of the wireless communication module of the present invention. However, as one skilled in the art will recognize, the wireless communication module of the present invention can be used in conjunction with any device that includes controls capable of communicating with CPU 41. Also, as described herein, wireless communication module 2 is also referred to as microcontroller radio card 2. As further described herein, microcontroller radio card 2 is but one embodiment of a wireless communication module of the present invention. Other embodiments may includes non-RF transmission technologies as explained herein.

In addition, although the embodiment illustrated in FIG. 7 and described above delineates specific transmission frequencies, etc., one skilled in the art recognizes that other embodiments of the present invention may include any frequencies that provide acceptable transmission and reception of signals and are allowed by law.

Wireless communication module 2 of the present invention offers advantages over prior art devices because it makes it possible to convert a previously non-wireless device to a device having full wireless communication functionality. In addition, the original device does not have to be substantially altered or modified. Of course, the wireless communication module may be altered to fit within various geometrical configurations. Changes to the original device such as modifications to firmware or software or minor physical alterations to ensure the module will fit within the original device are not considered substantial alterations or modifications as defined herein. Rather, substantial modifications include comprehensive modifications to the structure of the original device that require new molding of the original device body, changes that substantially impact the costs of manufacturing the modified device as compared to the original device, and or changes that substantially impact the amount of time it takes to manufacture the modified device as compared to the original device. Nothing in the art exists to allow for such enhancements in existing devices.

While chip 43 is primarily described as providing RF signals, it is to be appreciated that the present invention encompasses the use of a chip that transmits and receives other signal types. These other signal types include infrared, sound, cellular, magnetic, and light pulse.

As a result, certain embodiments of the present invention have been disclosed and discussed herein, although it should be understood that the present invention is not limited to these (or any other) particular embodiment. On the contrary, the present invention is intended to cover all alternatives, modifications and equivalents that may be included within the spirit and scope of the appended claims.

What is claimed:

1. A method for controlling one or more remote photographic flash devices from a camera body, the method comprising:
    electrically receiving a flash synchronization signal internal to a camera body including metal;
    using the flash synchronization signal to generate within the camera body an RF signal;
    communicating the RF signal via a wired connection to an antenna external to the camera body; and
    wirelesssly communicating the RF signal from the external antenna to the one or more remote photographic flash devices.

2. A method according to claim 1, further comprising controlling the one or more remote photographic flash devices in response to the one or more remote photographic flash devices receiving the RF signal.

3. A method according to claim 2, further comprising using the camera to take a first photograph in conjunction with said triggering the one or more remote photographic flash devices.

4. A method according to claim 3, further comprising using the camera to take a second photograph in conjunction with a second triggering of the one or more remote photographic flash devices associated with repeating the steps of the method of claim 1.

5. A method according to claim 1, wherein said flash synchronization signal is generated in response to a user interface input.

6. A method according to claim 1, wherein said communicating of the RF signal via a wired connection includes communicating the RF signal to a port having an external connector on the camera body to which the antenna is connected.

7. A method according to claim 1, wherein the antenna is removably connected to the exterior of the camera body.

8. A method according to claim 7, wherein the antenna is rotatable.

9. A method according to claim 1, wherein the antenna is rotatable.

10. A method according to claim 1, wherein said receiving a flash synchronization signal includes intercepting the flash synchronization signal as it flows from a camera control to one or more other components of the camera body.

11. A method according to claim 10, wherein the one or more other components of the camera body includes an external port of the camera body.

12. A method according to claim 10, wherein said intercepting does not interfere with the normal function of the camera.

13. A method according to claim 1, further comprising:
    receiving a second RF signal at the antenna; and
    using the second RF signal to generate within the camera body a second corresponding signal to one or more camera controls of the camera body.

14. A method according to claim 1, further comprising using a camera control of the camera body to alter the settings of a remote camera using a wireless communication using the antenna.

15. A method according to claim 1, further comprising using the antenna to wirelessly send a message to a remote camera to trigger the remote camera.

16. A method according to claim 1, further comprising using the antenna to wirelessly actuate a remote device.

17. A method according to claim 16, further comprising using the camera body to capture an image of an event related to the actuating of the remote device.

18. A method according to claim 1, wherein the wired connection includes a port of the camera body.

19. A method according to claim 1, wherein an ability to generate the RF signal within the camera body is activated via a control of the camera body.

20. A system for controlling one or more remote photographic flash devices from a camera, the system comprising:
    a camera body having wireless communication circuitry within the camera body that does not interfere with the camera body functioning as a camera, the camera body including metal;
    an electrical pathway operatively connecting the wireless communication circuitry to a control of the camera providing a flash synchronization signal, the wireless communication circuitry configured to generate an RF signal in response to receiving a flash synchronization signal; and
    an antenna element external to the camera body, the antenna element connected via a wired connection to the wireless communication circuitry, the wireless communication circuitry configured to communicate the RF signal to the antenna element for wireless communication to the one or more remote photographic flash devices.

21. A system according to claim 20, wherein the electrical pathway intercepts the flash synchronization signal as it flows from the control of the camera to one or more other components of the camera body.

22. A system according to claim 21, wherein the one or more other components of the camera body includes an external port of the camera body.

23. A system according to claim 20, wherein the antenna element is removably connected to the camera body.

24. A system according to claim 23, wherein the antenna element is rotatable.

25. A system according to claim 23, wherein the wireless communication circuitry is configured to be in an active state when the antenna element is connected to the camera body.

26. A system according to claim 20, wherein the antenna element is rotatable.

27. A system according to claim 20, wherein the wired connection includes an external port connector of the camera body.

28. A system according to claim 20, further comprising a remote device controllable using a signal communicated from the antenna element.

29. A system according to claim 28, wherein the signal communicated from the antenna element includes the RF signal generated in response to receiving a flash synchronization signal and the remote device is a flash device.

30. A system according to claim 28, wherein the remote device is a remote camera.

31. A system according to claim 30, wherein the signal is used to trigger the remote camera.

32. A system according to claim 30, wherein the signal is used to alter a setting of the remote camera.

33. A system according to claim 32, wherein a control of said camera body is used in altering the setting of the remote camera.

34. A system according to claim 28, wherein the signal is used to actuate the remote device.

35. A system according to claim 34, wherein the actuating the remote device is related to an event, the camera body being configured to capture an image of the event.

36. A system according to claim 20, wherein the wireless communication circuitry is configured to be activated using a control of the camera body.

37. A system for controlling one or more remote devices from a camera, the system comprising:
  a camera body having one or more camera controls, the camera body including metal;
  a wireless communication circuitry within said camera body and operatively connected to at least one of said one or more camera controls;
  an external antenna element connected via a wired connection to the wireless communication circuitry, said wireless communication circuitry configured to communicate a signal to the antenna element for RF wireless communication to one or more remote devices; and
  one or more remote devices associated with a wireless receiver for receiving the signal.

38. A system according to claim 37, wherein at least one of the one or more remote devices is a flash device and the signal includes a flash synchronization.

39. A system according to claim 37, wherein at least one of the one or more remote devices is a remote camera and the signal includes a command to alter a setting of the remote camera.

40. A system according to claim 37, wherein at least one of the one or more remote devices is a remote camera and the signal includes a trigger of the remote camera.

41. A system according to claim 37, wherein the signal includes a command to actuate at least one of the one or more remote devices.

42. A system according to claim 41, wherein the actuating includes actuating an event that is to be captured in an image by the camera body.

43. A system according to claim 37, wherein the wireless communication circuitry is configured to be activated using one of the one or more camera controls.

* * * * *